United States Patent
Mizumukai (10) Patent No.: US 8,494,130 B2
(45) Date of Patent: Jul. 23, 2013

(54) FACSIMILE DEVICE

(75) Inventor: Wataru Mizumukai, Nagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 1168 days.

(21) Appl. No.: 12/213,622

(22) Filed: Jun. 23, 2008

(65) Prior Publication Data

US 2009/0002773 A1    Jan. 1, 2009

(30) Foreign Application Priority Data

Jun. 28, 2007  (JP) .................................. 2007-169979

(51) Int. Cl.
*H04M 11/00* (2006.01)

(52) U.S. Cl.
USPC .................................. 379/100.15; 379/93.11

(58) Field of Classification Search
USPC ................. 379/93.09–93.11, 100.01–100.17,
379/142.07, 210.02, 393, 902, 908; 358/442;
340/3.53–3.54, 4.34
See application file for complete search history.

(56) References Cited

U.S. PATENT DOCUMENTS

| | | | | |
|---|---|---|---|---|
| 4,947,345 | A * | 8/1990 | Paradise et al. | 358/442 |
| 5,337,349 | A * | 8/1994 | Furohashi et al. | 379/100.14 |
| 6,400,464 | B1 * | 6/2002 | Suehiro | 358/1.16 |
| 6,473,498 | B1 * | 10/2002 | Foth | 379/93.09 |
| 6,496,283 | B1 | 12/2002 | Kabeya | |
| 2007/0042801 | A1 * | 2/2007 | Miyata | 455/550.1 |
| 2010/0085593 | A1 * | 4/2010 | Peled et al. | 358/1.14 |

FOREIGN PATENT DOCUMENTS

| | | |
|---|---|---|
| JP | 04-343567 A | 11/1992 |
| JP | 11-346278 A | 12/1999 |
| JP | 2001-136316 | 5/2001 |
| JP | 2004-112557 A | 4/2004 |
| JP | 2007-104608 A | 4/2007 |

OTHER PUBLICATIONS

JP Notification of Reasons for Rejection dated Aug. 23, 2011, corresponding Application No. 2007-169979; English Translation.

* cited by examiner

*Primary Examiner* — Simon Sing
*Assistant Examiner* — Jeffrey Lytle
(74) *Attorney, Agent, or Firm* — Banner & Witcoff, Ltd.

(57) ABSTRACT

A facsimile device may be capable of sending and receiving facsimile data by utilizing a first communication line. The facsimile device may comprise an information input device configured to input information, a line connecting device that connects the first communication line in a case where predetermined information is input to the information input device, a line disconnecting device that disconnects the first communication line in a case where facsimile sending instruction information is input to the information input device when the first communication line is in a state of having been connected by the line connecting device, and a facsimile sending device that re-connects the first communication line disconnected by the line disconnecting device and sends facsimile data by utilizing the first communication line in accordance with the facsimile sending instruction information.

6 Claims, 6 Drawing Sheets

| User ID | Facsimile | Copy | Scan | Telephone |
|---------|-----------|------|------|-----------|
| 001 | ○ | × | × | × |
| 002 | × | × | ○ | × |
| 003 | ○ | ○ | ○ | ○ |
| | | | | |

FACSIMILE DEVICE

CROSS-REFERENCE TO RELATED APPLICATION

This application claims priority to Japanese Patent Application No. 2007-169979, filed on Jun. 28, 2007, the contents of which are hereby incorporated by reference into the present application.

BACKGROUND OF THE INVENTION

1. Field of the Invention

The present invention relates to a facsimile device.

2. Description of the Related Art

Sending and receiving facsimile data is conventionally performed in accordance with the communication procedure described below. A sending side facsimile device sends a dial signal to a telephone switchboard in a case where a destination telephone number is input by a user. A line is thus connected between the sending side facsimile device and a receiving side facsimile device corresponding to the destination telephone number. After the line has been connected between the sending side facsimile device and the receiving side facsimile device, the sending side facsimile device sends a facsimile tone signal to the receiving side facsimile device. When the receiving side facsimile device receives the facsimile tone signal, the receiving side facsimile device responds with a method capable of receiving the facsimile data, etc. as a facsimile tone signal. Based on the facsimile tone signal from the receiving side facsimile device, the sending side facsimile device sends facsimile data obtained by a scanner reading a document in an image signal format that has been adjusted to the method capable of receiving the facsimile data. When the receiving side facsimile device receives the facsimile data, the receiving side facsimile device sends a reception completed signal to the sending side facsimile device. The sending side facsimile device sends facsimile data in sequence while verifying the reception completed signal. Japanese Patent Application Publication No. 2001-136316 discloses a facsimile device which, in a case where facsimile data is received after a user has operated a priority sending button, a response for receiving that facsimile data is prohibited.

BRIEF SUMMARY OF THE INVENTION

In the prior art, a response for receiving facsimile data from an external facsimile device is prohibited after the priority sending button has been operated. However, processes performed before prohibiting the response are allowed. For example, the following are allowed: an incoming call (for example, ringing) in response to an outgoing call from the external facsimile device, connecting a line with that facsimile device, and receiving facsimile data from the facsimile device. In this case, facsimile data cannot be sent until the line with the external facsimile device has been disconnected.

A technique is taught in the present specification that, where it is anticipated that a user will want to send facsimile data, is capable of reliably preventing this sending from being obstructed by a reception of facsimile data.

One feature taught in the present specification is a facsimile device capable of sending and receiving facsimile data by utilizing a first communication line. The facsimile device may comprise an information input device, a line connecting device, a line disconnecting device, and a facsimile sending device. The information input device may be configured to input information. The line connecting device may connect the first communication line in a case where predetermined information is input to the information input device. The line disconnecting device may disconnect the first communication line in a case where facsimile sending instruction information is input to the information input device when the first communication line is in a state of having been connected by the line connecting device. The facsimile sending device may re-connect the first communication line disconnected by the line disconnecting device, and send facsimile data by utilizing the first communication line in accordance with the facsimile sending instruction information. Furthermore, "disconnect" may refer "release" or "open", and "connect" may refer "occupy" or "close".

In the above facsimile device, when the information showing the possibility of facsimile sending being executed (the predetermined information) is input to the information input device, the facsimile device connects the communication line. "Connect" may refer to a state where the line is being utilized. For example, in the case where a handset is present, the communication line is in a connected state while the handset is in a raised state (off the hook, for example). An incoming call for facsimile data from outside is not received while the communication line is in a connected state. Since the communication line is connected when the predetermined information is input to the information input device, incoming calls for sending facsimile data from another facsimile device to the present device are prohibited. When, in this state, facsimile sending instruction information is input to the information input device, the facsimile device disconnects the communication line, re-connects the communication line, and sends facsimile data. As a result, after the predetermined information has been input to the facsimile device, the operation of sending facsimile data is not obstructed by the reception of facsimile data, and facsimile data can thus be sent reliably.

When the communication line remains connected for a long period, a busy tone may be generated by a telephone switchboard. In this case, the sending of facsimile data cannot be performed. With the facsimile device described above, when the facsimile sending instruction information is input to the information input device, the communication line that is in a connected state is temporarily disconnected, and consequently the facsimile device can send the facsimile data reliably even in the case where the busy tone is generated during the initial connected state. Moreover, it is preferred that this temporary disconnecting of the communication line is for as short a period as possible. For example, the period may be set to be so short that incoming calls for facsimile data sent from the outside cannot be received.

DETAILED DESCRIPTION OF THE PREFERRED EMBODIMENT (Configuration of a Multi-Function Device)

Figure 1:
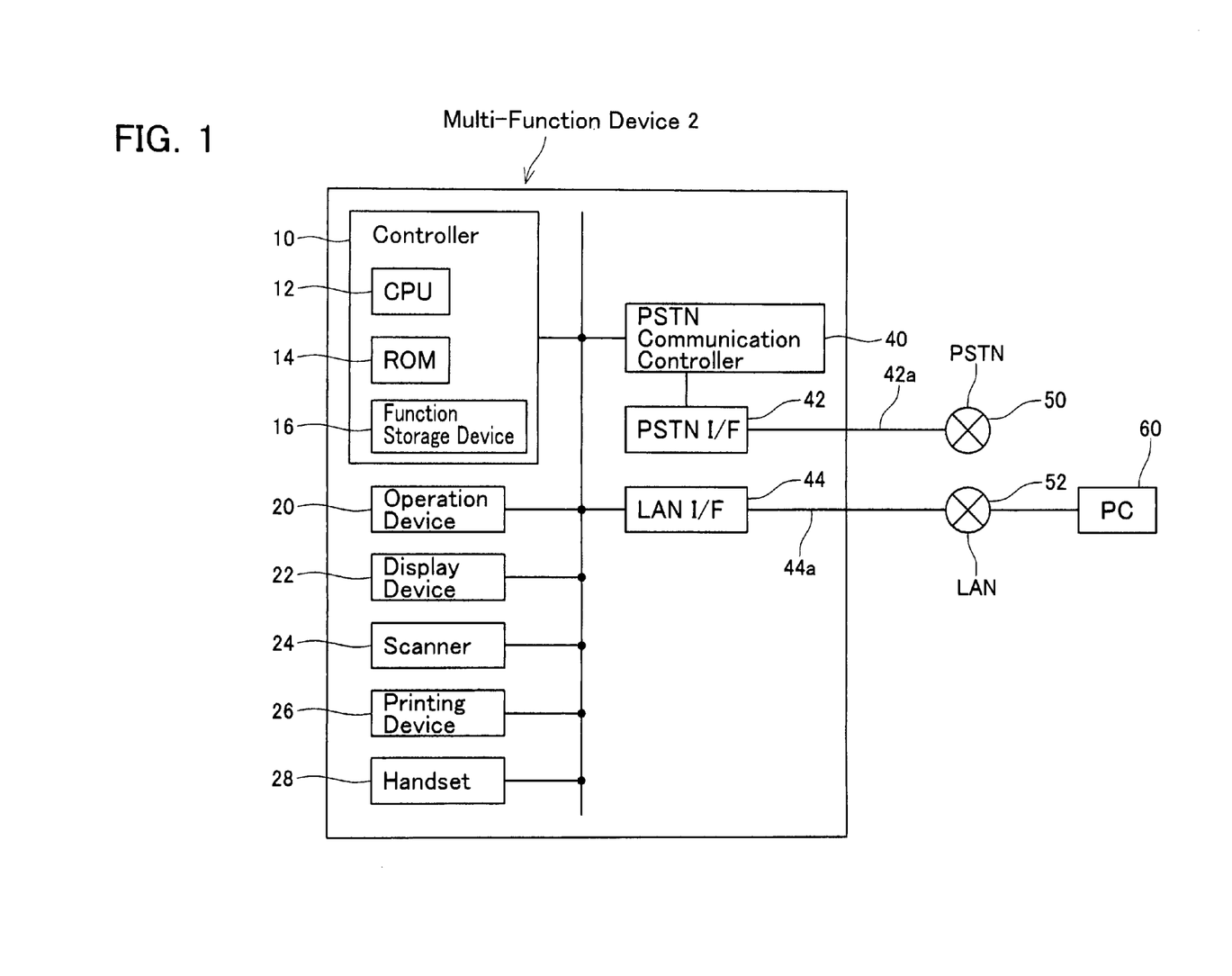
FIG. 1 shows a simplified view of the configuration of a multi-function device.

An embodiment will be described with reference to the figures. FIG. 1 shows a simplified view of the configuration of a multi-function device 2 of the present embodiment. The multi-function device 2 comprises a controller 10, an operation device 20, a display device 22, a scanner 24, a printing device 26, a handset 28, a PSTN communication controller 40, a PSTN interface 42, and a LAN interface 44. The controller 10 has a CPU 12, a ROM 14, a function storage device 16, etc. The CPU 12 executes processes in accordance with programs stored in the ROM 14. The ROM 14 stores programs. The contents of the processes executed by the CPU 12 in accordance with the programs stored in the ROM 14 will be described in detail later.

Figure 2:
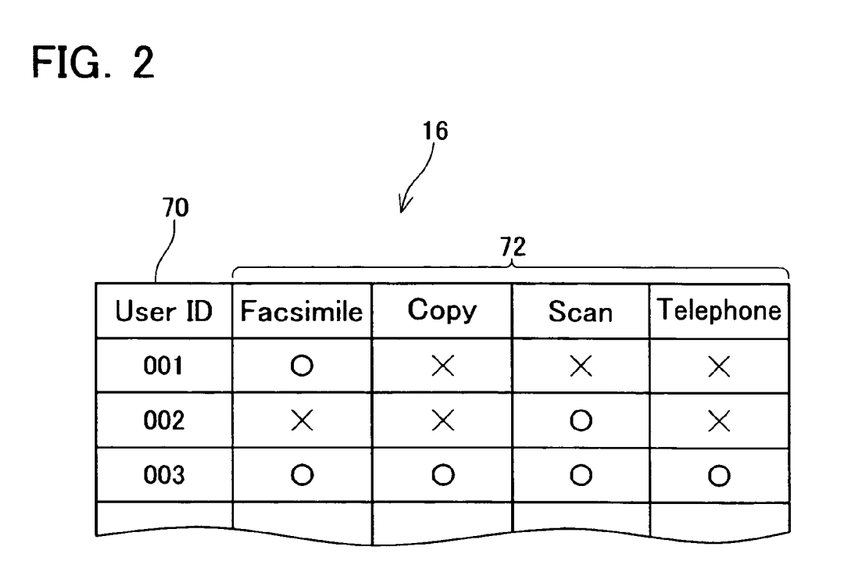
FIG. 2 shows an example of stored contents of a function storage device.

FIG. 2 shows an example of stored contents of the function storage device 16. The function storage device 16 stores, for each of a plurality of users, an association of user ID 70, and functions 72 that the user is allowed to execute. "O" in the columns of the functions 72 means that the execution of this function is allowed. "X" in the columns of the functions 72 means that the execution of this function is prohibited. For example, the user with the user ID "001" is allowed to execute a facsimile sending function, and is prohibited from executing a copy function, scan function, and telephone function (a function of making outgoing calls). Further, for example, the user with the user ID "003" is allowed to execute all the functions.

Moreover, in addition to the user ID 70 and the functions 72, the function storage device 16 may store passwords of the users. In this case, when the user ID and the password are input, the multi-function device 2 may authenticate whether the two match.

The operation device 20 shown in FIG. 1 consists of a plurality of keys. By operating the operation device 20, the user can input information and instructions to the multi-function device 2.

Examples of the information and instructions that can be input by the user are given below.

(1) The user can select whether to use any out of the facsimile function, the copy function, the telephone function and the scan function.

(2) The user can input a facsimile sending instruction. Specifically, the user can input the telephone number of a destination of facsimile data, and can then press a facsimile sending button.

(3) The user can input an instruction to make an outgoing telephone call. Specifically, the user can lift the handset 28 and input the telephone number of a destination to be called.

(4) The user can input his own user ID.

(5) The user can input a copy instruction. Specifically, the user can press a copy start button.

(6) The user can input a scan instruction. Specifically, the user can press a scan start button.

(7) The user can input command information to end the usage of the multi-function device 2.

Specifically, the user can press an end usage button.

The display device 22 is capable of displaying information. The scanner 24 is capable of scanning documents and creating scan data. The printing device 26 is capable of printing an image on a print medium. The printing device 26 is capable of printing the scan data created by the scanner. That is, the multi-function device 2 has a copy function. Further, the printing device 26 is capable of printing data sent from outside. For example, the printing device 26 is capable of printing facsimile data that has been received. Further, for example, the printing device 26 is capable of printing data that has been sent from a PC 60 (to be described). The handset 28 has a microphone and a speaker (not shown). The user can perform telephone communication using the handset 28.

The PSTN communication controller 40 is capable of performing facsimile communication and telephone communication in accordance with commands from the controller 10. For example, the PSTN communication controller 40 is capable of changing a PSTN line 42a (to be described) from a disconnected state to a connected state, and from the connected state to the disconnected state. "Disconnected state" refers to a state in which the line is not in use, and which allows incoming facsimile data and calls from the outside to be received. "Disconnected state" may refer "released state" or "opened state". Further, "connected state." refers to a state in which the line is in use, and which prohibits incoming facsimile data and calls from the outside. "Connected state" may refer "occupied state" or "closed state". The PSTN communication controller 40 includes, for example, an NCU. The PSTN communication controller 40 is connected with the PSTN interface 42. The PSTN interface 42 is connected with the PSTN line 42a. The PSTN line 42a is connected with a PSTN 50. The multi-function device 2 can send and receive facsimile data via the PSTN interface 42 and the PSTN line 42a. The multi-function device 2 can perform telephone communication via the PSTN interface 42 and the PSTN line 42a. The LAN interface 44 is connected with a LAN line 44a. The LAN line 44a is connected with a LAN 52. The LAN 52 is connected with the PC 60. The multi-function device 2 can perform communication with the PC 60 via the LAN interface 44, the LAN line 44a, and the LAN 52.

The user can send a facsimile sending instruction to the multi-function device 2 by operating a mouse, etc. of the PC 60. The facsimile sending instruction includes data to be sent as facsimile data and the telephone number of a destination. When the facsimile sending instruction is input from the PC 60, the multi-function device 2 can send the facsimile data included in the facsimile sending instruction to the telephone number included in the facsimile sending instruction.

(Process Executed by the Multi-Function Device)

Figure 3:
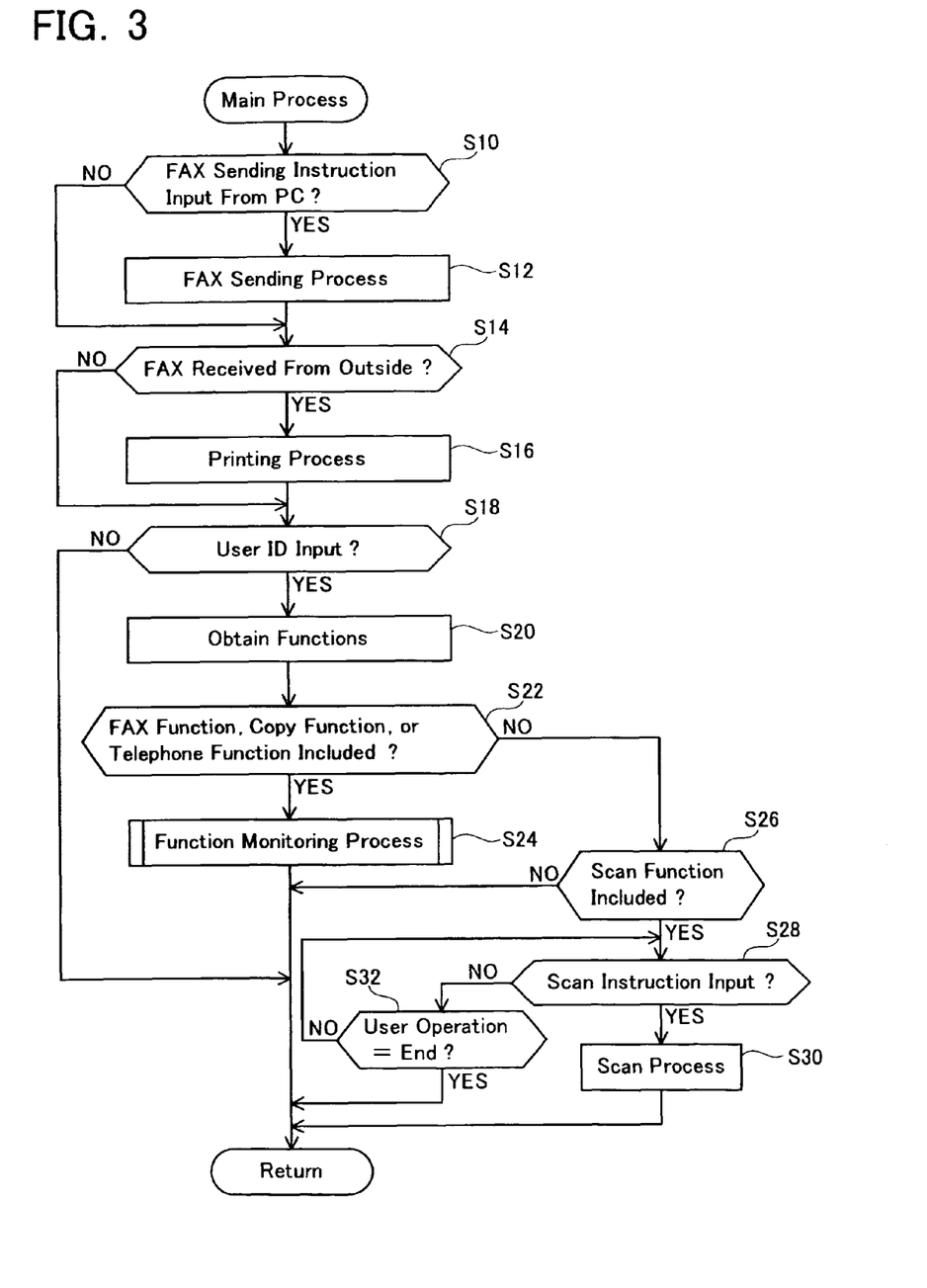
FIG. 3 shows a flow chart of a main process.

Next, the contents of a process executed by the CPU 12 will be described. FIG. 3 shows a flow chart of a main process. Moreover, processes not particularly related to the technique of the present specification have been omitted from FIG. 3. The CPU 12 monitors whether the facsimile sending instruction has been input from the PC 60 (S10). In the case where S10 is YES, the CPU 12 executes a facsimile sending process (S12). Specifically, the CPU 12 commands the PSTN communication controller 40 to send the data from the PC 60 as facsimile data. The PSTN communication controller 40 connects the PSTN line 42a, and makes a call to the telephone number included in the facsimile sending instruction. The facsimile data is thus sent.

The CPU 12 monitors whether facsimile data has been received from outside (S14). In the case where S14 is YES, the CPU 12 executes a process to print the facsimile data that has been received (S16). Specifically, the CPU 12 drives the printing device 26. The printing device 26 prints an image corresponding to the received facsimile data onto a print medium.

Further, the CPU 12 monitors whether the user ID has been input (S18). The user can input the user ID by operating the operation device 20. In this case, YES is determined in S18. In the case where S18 is YES, the CPU 12 retrieves the function storage device 16 using the input user ID as a key. The CPU 12 thus obtains the functions that the user is allowed to execute (S20). For example, in the case where the user ID "001" in the example in FIG. 2 has been input, the CPU 12 obtains the "facsimile sending function". Further, for example, in the case where the user ID "003" has been input, the CPU 12 obtains the "facsimile sending function", the "copy function", the "scan function", and the "telephone function". When S20 ends, the process proceeds to S22. In the case where S18 is NO, the process returns to S10. Although this is not shown in the flow chart in FIG. 3, a process for causing ringing, etc. is executed in the case of an incoming telephone call.

In S22, the CPU 12 determines whether at least one of "facsimile sending function", "copy function", or "telephone function" is included in the functions obtained in S20. For example, in the case where the user ID "001" or the user ID "003" has been input in S18, YES is determined in S22. In this case, the process proceeds to the function monitoring process of S24. The contents of the function monitoring process will be described in detail later. In the case where the user ID "002" has been input in S18, NO is determined in S22. In this case, the process proceeds to S26.

In S26, the CPU 12 determines whether the functions obtained in S20 include the "scan function" (S26). For example, in the case where the user ID "002" has been input in S18, YES is determined in S26. In this case, the process proceeds to S28. In the case where a user ID has been input in S18 that does not allow any of the functions to be executed, NO is determined in S26. In this case, the user is prohibited from executing any of the functions.

In S28, the CPU 12 monitors whether a scan instruction has been input (S28). That is, the CPU 12 monitors whether the user has pressed a scan start button. In the case where S28 is YES, the CPU 12 drives the scanner 24 (S30). A document that has been placed by the user is thus scanned by the scanner 24. Scan data created by the scanner 24 is stored in a predetermined storage area (for example, a RAM, etc.).

The CPU 12 monitors whether information has been input instructing that the user has finished utilizing the multi-function device 2 (S32). That is, the CPU 12 monitors whether an end use button has been pressed by the user. In the case where S32 is YES, the process returns to S10. In the case where S32 is NO, the CPU 12 returns to S28 and monitors whether the scan start button has been pressed.

Figure 4:
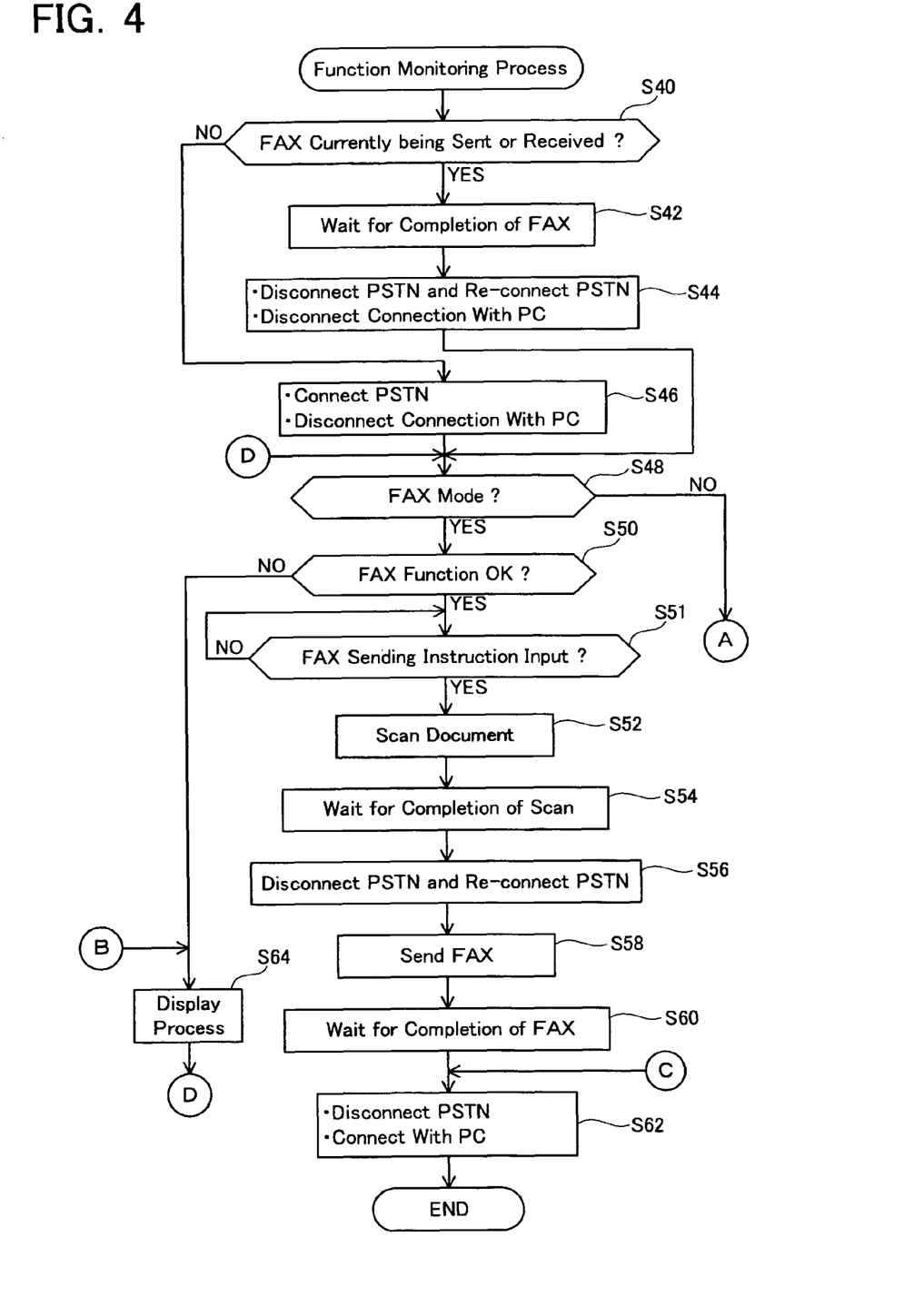
FIG. 4 shows a flow chart of a function monitoring process.

Next, the contents of the function monitoring process of S24 will be described. FIG. 4 shows a flow chart of the function monitoring process. The CPU 12 determines whether facsimile data is currently being sent or received (S40). In the case where S40 is YES, the CPU 12 waits for the sending or receiving of the facsimile data to be completed (S42). When the sending or receiving of the facsimile data has been completed, the CPU 12 temporarily disconnects the PSTN line 42a, and immediately executes a process to connect the PSTN line 42a (S44). The CPU 12 maintains the PSTN line 42a in a connected state due to facsimile data being sent or received. Specifically, the CPU 12 instructs the PSTN communication controller 40 to temporarily disconnect and then connect the PSTN line 42a. Further, the CPU 12 executes a process to disconnect the connection with the PC 60. The PC 60 is thus prohibited from accessing the multi-function device 2. For example, the sending of the facsimile sending instruction from the PC 60 to the multi-function device 2 is prohibited. When S44 ends, the process proceeds to S48.

Moreover, the process of disconnecting the connection (disconnecting process) with the PC 60 may be executed before the sending or receiving of the facsimile data has been completed. For example, the disconnecting process may be performed before S40 or S42. Further, for example, it may also be determined whether a call is currently being made in S40. In the case where a call is currently being made, the CPU 12 may maintain the connected state of the PSTN line 42a even after that call has been finished.

In the case of NO in S40, the CPU 12 executes a process to connect the PSTN line 42a (S46). Specifically, the CPU 12 instructs the PSTN communication controller 40 to connect the PSTN line 42a. Further, the CPU 12 executes the process to disconnect the connection with the PC 60. As described above, the user can select which function to utilize (FAX mode, copy mode, telephone mode, scan mode) by operating the operation device 20. The CPU 12 monitors which function (mode) has been selected (S48, S70, S76, S86). The CPU 12 determines whether the FAX mode has been selected (S48). In the case where S48 is NO, the process proceeds to S70 of FIG. 5. In the case where S48 is YES, the CPU 12 determines whether the "facsimile sending function" is included in the functions obtained in S20 (S50). In the case where S50 is NO, the CPU 12 displays information on the display device 22 (see FIG. 1) showing that there is no authorization to execute facsimile sending (S64). When S64 ends, the process returns to S48.

In the case where S50 is YES, the CPU 12 monitors whether the facsimile sending instruction has been input (S51). That is, the CPU 12 monitors whether the user has pressed the facsimile sending button after inputting the telephone number. In the case where S51 is YES, the CPU 12 drives the scanner 24 (S52). The document that has been placed by the user is thus scanned by the scanner 24. The CPU 12 waits for the completion of the scan (S54). The scan data (facsimile data) created by the scanner 24 is temporarily stored in a predetermined storage area (for example, a RAM, etc.). Next, the CPU 12 temporarily disconnects the PSTN line 42a that was connected in S44 or S46, and then immediately executes a process to connect the PSTN line 42a (S56). Specifically, the CPU 12 instructs the PSTN communication controller 40 to temporarily disconnect and then connect the PSTN line 42a. Next, the CPU 12 instructs the PSTN communication controller 40 to send the facsimile data. The PSTN communication controller 40 thus makes a call to the telephone number input in S51, and sends the facsimile data created by the scanner 24 to that telephone number (S58). The CPU 12 waits for the completion of sending of the facsimile data (S60).

Next, the CPU 12 executes a process to disconnect the PSTN line 42a (S62). Specifically, the CPU 12 instructs the PSTN communication controller 40 to disconnect the PSTN line 42a. Further, the CPU 12 executes a process to restore the connection with the PC 60 that was disconnected in S44 or S46 (S62). Access from the PC 60 to the multi-function device 2 is thus allowed. When S62 ends, the process returns to S10 of FIG. 3.

As described above, the process proceeds to S70 of FIG. 5 in the case of NO in S48. In S70, the CPU 12 determines whether the copy mode has been selected. In the case where S70 is NO, the process proceeds to S76. In the case where S70 is YES, the CPU 12 determines whether the "copy function" is included in the functions obtained in S20 of FIG. 3 (S71). In the case where S71 is NO, the CPU 12 displays information (S64 of FIG. 4) on the display device 22 (see FIG. 1) showing that there is no authorization to execute copying. In the case where S71 is YES, the CPU 12 monitors whether the copy instruction has been input (S72). That is, the CPU 12 monitors whether the user has pressed the copy start button.

Figure 5:
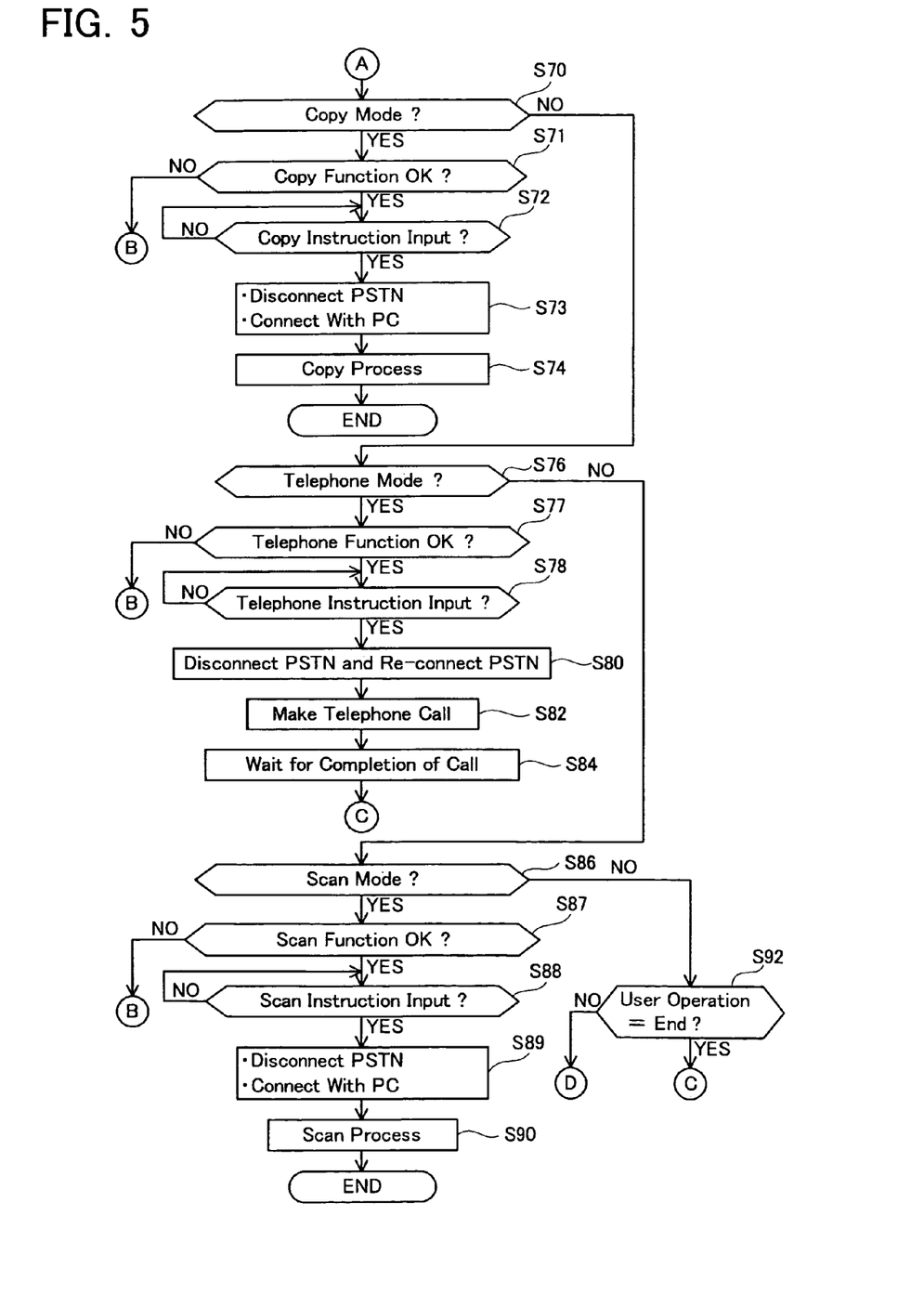
FIG. 5 shows a continuation of the flow chart of FIG. 4.

In the case where S72 is YES, the CPU 12 disconnects the PSTN line 42a and restores the connection with the PC 60 (S73). This process is the same as the process of S62 of FIG. 4. Next, the CPU 12 executes copying (S74). First, the CPU 12 drives the scanner 24. The document that has been placed by the user is thus scanned by the scanner 24. Next, the CPU 12 drives the printing device 26. The printing device 26 thus prints an image corresponding to the scan data created by the scanner 24 onto a print medium. The copy process is thus completed. Moreover, the process of S73 may be performed during the process of S74, or may be performed after the process of S74 has been completed. Further, the process of S73 may be performed after the process of S70 and before the process of S72.

In S76, the CPU 12 determines whether the telephone mode has been selected. In the case where S76 is NO, the process proceeds to S86. In the case where S76 is YES, the CPU 12 determines whether the "telephone function" is included in the functions obtained in S20 of FIG. 3 (S77). In the case where S77 is NO, the CPU 12 displays information (S64 of FIG. 4) on the display device 22 (see FIG. 1) showing that there is no authorization to make telephone calls. In the case where S77 is YES, the CPU 12 determines whether the telephone instruction has been input (S78). That is, the CPU 12 monitors whether the user has input the telephone number of a destination to be called.

In the case where S78 is YES, the CPU 12 temporarily disconnects the PSTN line 42a that was connected in S46 or S48 of FIG. 4, and immediately executes a process to connect the PSTN line 42a (S80). Specifically, the CPU 12 instructs the PSTN communication controller 40 to temporarily disconnect and then connect the PSTN line 42a. Next, the CPU 12 instructs the PSTN communication controller 40 to call the telephone number input in S78. The PSTN communication controller 40 thus makes a call to the telephone number input in S78 (S82). The CPU 12 waits for the completion of the telephone communication (S84). When S84 is completed, the process proceeds to S62 of FIG. 4.

In S86, the CPU 12 determines whether the scan mode has been selected. In the case where S86 is NO, the process proceeds to S92. In the case where S86 is YES, the CPU 12 determines whether the "scan function" is included in the functions obtained in S20 of FIG. 3 (S87). In the case where S87 is NO, the CPU 12 displays information (S64 of FIG. 4) on the display device 22 (see FIG. 1) showing that there is no authorization to execute scanning. In the case where S87 is YES, the CPU 12 monitors whether the scan instruction has been input (S88). That is, the CPU 12 monitors whether the user has pressed the scan start button.

In the case where S88 is YES, the CPU 12 disconnects the PSTN line 42a and restores the connection with the PC 60 (S89). This process is the same as the process of S62 of FIG. 4. Next, the CPU 12 drives the scanner 24 (S90). The document that has been placed by the user is thus scanned by the scanner 24. The scan data created by the scanner 24 is temporarily stored in a predetermined storage area (for example, a RAM, etc.). Moreover, the process of S89 may be performed during the process of S90, or may be performed after the process of S90 has been completed. Further, the process of S89 may be performed after the process of S86 and before the process of S88.

In S92, the CPU 12 monitors whether information has been input instructing that the user has finished using the multi-function device 2. That is, the CPU 12 monitors whether the end use button has been pressed by the user. In the case where S92 is YES, the process proceeds to S62 of FIG. 4. In the case where S92 is NO, the CPU 12 returns to S48 of FIG. 4 and monitors whether the mode has been selected.

In S92, the CPU 12 may determine whether the time that has elapsed since the user ID was input in S18 of FIG. 3 exceeds a predetermined value. That is, the CPU 12 may proceed to S62 of FIG. 4 when the time that has elapsed since the user ID was input exceeds the predetermined value. In this case, the PSTN line 42a can be disconnected automatically in the case where the user does not perform operations even though the user ID was input in S18. Further, the connection with the PC 60 can be restored automatically. In the case where the user does not execute any functions, it is thus possible to prevent the PSTN line 42a from staying connected and to prevent the connection with the PC 60 from remaining disconnected. Further, in S92 only the fact of the user having operated the end use button may be monitored, only the time that has elapsed since the user ID was input in S18 of FIG. 3 may be monitored, or both may be monitored.

Figure 6:
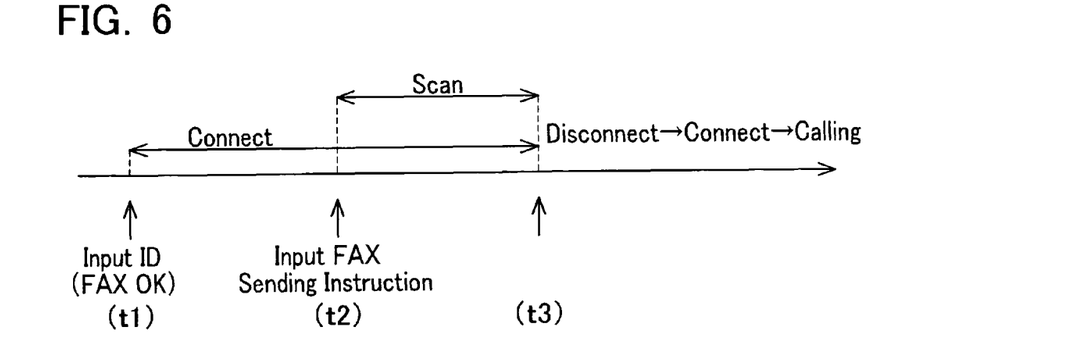
FIG. 6 shows a time chart of processes realized by the multi-function device.

FIG. 6 shows a time chart of processes realized by the multi-function device 2 that has the configuration described above. When the user ID is input to the operation device 20 of a user who is allowed to execute the facsimile sending function, the multi-function device 2 connects the PSTN line 42a (time t1). When the facsimile sending instruction is input to the operation device 20, the multi-function device 2 starts the scan (time t2). The connected state of the PSTN line 42a is maintained throughout the scan. When the scan has ended, the multi-function device 2 disconnects and then re-connects the PSTN line 42a, and calls the telephone number that has been input by the user (time t3). The facsimile data is thus sent. With this configuration, incoming calls for facsimile data sent from outside are prohibited from time t1 to time t3. The user can thus send the facsimile data without being disturbed by receiving facsimile data.

Moreover, with the above configuration, the PSTN line 42a is temporarily disconnected before making the call. As a result, it is possible to create a state in which there is no busy tone even in the case where the PSTN line 42a remains connected over a long period and the busy tone has consequently been generated. The facsimile data can thus be sent reliably.

Further, when the user ID is input to the operation device 20 of a user who is allowed to execute the copy function or the telephone function, the multi-function device 2 connects the PSTN line 42a at time t1. The user can thus make a copy or make a telephone call without being disturbed by receiving facsimile data.

Further, the multi-function device 2 disconnects the connection with the PC 60 at time t1. As a result, in the case where it is intended that a user will send the facsimile data by directly using the multi-function device 2, it is possible to prohibit another user from utilizing the PC 60 to instruct that facsimile data be sent. The former user thus has priority in sending the facsimile.

Figure 7:
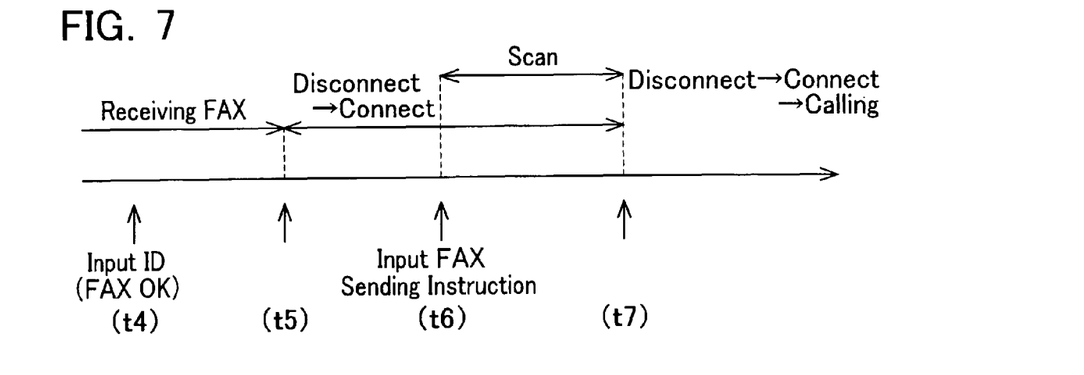
FIG. 7 shows a time chart of other processes realized by the multi-function device.

FIG. 7 shows a time chart of other processes realized by the multi-function device 2. In this time chart, while facsimile data is being received (time t4), the user ID is input to the operation device 20 of a user who is allowed to execute the facsimile sending function. In this case, the multi-function device 2 temporarily disconnects and then connects the PSTN line 42a after the facsimile data has been received (time t5). The start of a scan at time t6, and the disconnecting and re-connecting of the PSTN line 42a, and then the calling of a telephone number at time t7 are the same as in FIG. 6.

Figure 8:
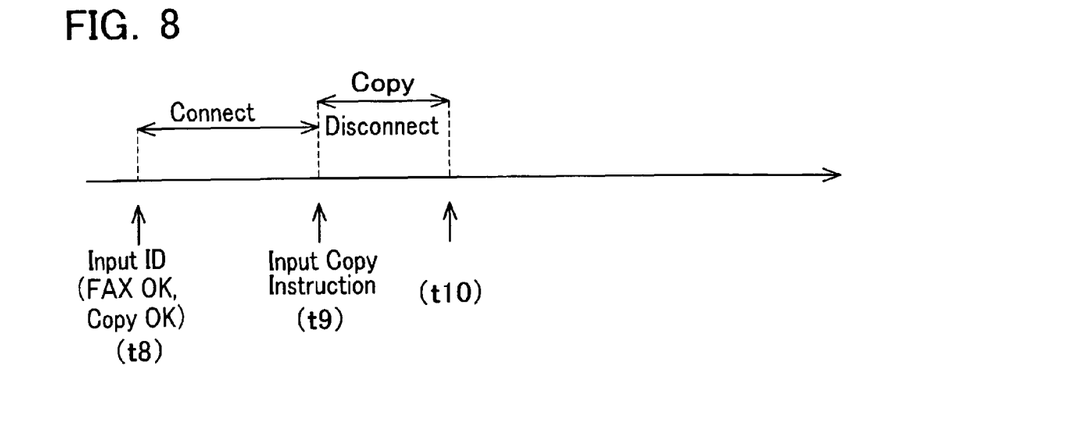
FIG. 8 shows a time chart of other processes realized by the multi-function device.

FIG. 8 shows a time chart of other processes realized by the multi-function device 2. When the user ID is input to the operation device 20 of a user who is allowed to execute the facsimile sending function and the copy function, the multi-function device 2 connects the PSTN line 42*a* (time t8). When the user has input the copy instruction to the operation device 20, the multi-function device 2 disconnects the PSTN line 42*a* and starts the copying (scanning and printing) (time t9). With this configuration, it is possible to prevent the PSTN line 42*a* from remaining connected even though the user is not sending facsimile data. Moreover, as described above, the time that the PSTN line 42*a* is disconnected does not need to be time t9. For example, the PSTN line 42*a* may be disconnected at time t10.

In the present embodiment, when the user ID is input to the operation device 20 of a user who is allowed to execute the facsimile sending function, and then the facsimile sending function is executed, the process of S62 of FIG. 4 is executed (that is, the PSTN line 42*a* is disconnected). However, the process of S62 need not be executed even if the facsimile sending function is executed. In this case, for example, the process of S62 may be executed on condition that the user has operated the end use button. Further, for example, the process of S62 may be executed on condition that the time that has elapsed since the user ID was input in S18 of FIG. 3 exceeds a predetermined value. Further, for example, the process of S62 may be executed on condition that either the user has operated the end use button or that the elapsed time exceeds the predetermined value. With this configuration, the PSTN line 42*a* is maintained in the connected state even after one facsimile sending has been executed. The user can thus execute facsimile sending continuously without being disturbed by receiving facsimile data.

Part of the technique of the aforementioned embodiment and variants thereof are set forth below.

(1) Various examples can be given of the technique for inputting the predetermined information to the information input device. For example, a line connecting device may determine that the predetermined information is input to the information input device when a predetermined button (for example, a button for utilizing the facsimile) is operated by the user. Further, in the case where the facsimile device is connected with an external device, the line connecting device may determine that the predetermined information is input to the information input device when a predetermined signal is received that has been sent from the external device. Further, the line connecting device may determine that the predetermined information is input to the information input device when user information is input.

(2) The facsimile device may further comprise a user-function storage device configured to store, for each user, an association of user information identifying the user and function information identifying a function that the user is allowed to utilize. In this case, the line connecting device may determine that the predetermined information is input to the information input device in a case where user information associated with function information including a facsimile sending function is input to the information input device. In this case, a line disconnecting device may disconnect the first communication line in a case where the following condition is satisfied: (A) user information associated with function information including the facsimile sending function and other function is input to the information input device; and (B) utilizing instruction information concerning the other function is input to the information input device when the first communication line is in a state of having been connected by the line connecting device. With this configuration, the connected communication line is disconnected when the user executes another function without performing the function of sending facsimile data. It is possible to prevent the communication line from remaining connected even though facsimile data is not sent.

The facsimile device may further comprise a scanner that creates facsimile data by scanning a document. In this case, the facsimile sending instruction information may include destination information identifying a destination of the facsimile data, and scan start instruction information. In this case, the line disconnecting device may disconnect the first communication line immediately after the destination information and the scan start instruction information have been input to the information input device when the first communication line is in a state of having been connected by the line connecting device. That is, the first communication line may be disconnected while the scan of the document is being executed. Alternatively, the line disconnecting device may disconnect the first communication line in a case where the following condition is satisfied: (A) the destination information and the scan start instruction information is input to the information input device when the first communication line is in a state of having been connected by the line connecting device; and (B) the scanner completes the scanning of the document in accordance with the scan start instruction information. With this configuration, facsimile data is not received while the document is being scanned.

In the case where the predetermined information is input to the information input device while facsimile data from outside (sent through the first communication line) is being received, the line connecting device may maintain the state of the first communication line being connected after all of the facsimile data has been received. Moreover, "maintaining the state of the first communication line being connected" includes a state where the first communication line remains continually in the connected state after the facsimile data has been received, and includes temporarily disconnecting and then connecting the first communication line after the facsimile data has been received.

The facsimile device may be capable of communicating with an external device on a network by utilizing a second communication line. The facsimile device may further comprise a communication prohibiting device. The facsimile sending device may be configured to send the facsimile data in accordance with the facsimile sending instruction information from the external device. The communication prohibiting device may prohibit communication with the external device in the case where the predetermined information is input to the information input device. With this configuration, in a situation where it is anticipated that a user will want to send facsimile data, it is possible to prohibit another user from utilizing an external device to instruct facsimile data to be sent. It is thus possible to prevent an instruction from the former user to send facsimile data from being obstructed by an instruction to send facsimile data from a latter user. The former user can thus have priority in sending the facsimile data.

Copying cannot be performed while the facsimile data is being received and printed. The following configuration may be adopted so that copying will not be obstructed by the reception of facsimile data. The facsimile device may further comprise: a scanner that creates scan data by scanning a document; a printing device that prints the scan data created by the scanner; and a controller that makes the scanner create the scan data and makes the printing device print the scan data in a case where copy instruction information is input to the information input device. The line connecting device may connect the first communication line in a case where information showing the possibility of a copy being executed is input to the information input device. With this configuration, where it is anticipated that a user will want to perform copying, it is possible to prevent this copying operation from being obstructed by the reception of facsimile data.

Where it is anticipated that a user will want to make an outgoing call, the following configuration may be adopted so that the call will not be obstructed by the reception of facsimile data. The facsimile device may further comprise a telephone call device. The line connecting device may connect the first communication line in a case where information showing the possibility of a telephone call being executed is input to the information input device. The line disconnecting device may disconnect the first communication line in a case where telephone call instruction information has been input to the information input device when the first communication line is in the state of having been connected by the line connecting device. The telephone call device may re-connect the first communication line disconnected by the line disconnecting device and may make a telephone call by utilizing the first communication line in accordance with the telephone call instruction information. In this configuration, when the information (the predetermined information) showing the possibility of a telephone call being executed is input to the information input device, the facsimile device connects the communication line. As a result, after the predetermined information has been input to the information input device, calls for sending facsimile data that are sent to the present device from another facsimile device are prohibited from being received. The user can thus make the telephone call without being obstructed by an incoming call from another facsimile device.

The facsimile device may send and receive facsimile data utilizing a general public line (a PSTN: Public Switched Telephone Network). The facsimile device may disconnect the communication line when a predetermined instruction is input by the user while the communication line is in a connected state. The technique set forth in the present specification may be realized by a multi-function device having a facsimile function, telephone function, copy function, etc. The multi-function device may connect the PSTN line in a case where there is the possibility of the facsimile function, the telephone function, or the copy function being executed. Further, in this case, the connection with an external device (for example, a PC) may be disconnected. The multi-function device may not connect the PSTN line in a case where there is the possibility of only the scan function being executed.

What is claimed is:

1. A facsimile device capable of sending and receiving facsimile data by utilizing a first communication line, the facsimile device comprising:
    a user-function storage device configured to store, for each user, an association of user information identifying the user and function information identifying a function that the user is allowed to utilize;
    an information input device configured to receive input information;
    a line connecting device that connects the first communication line in a case where first user information is received by the information input device, the first user information being associated with function information including a facsimile sending function and a specific function which is different from the facsimile sending function;
    a line disconnecting device that disconnects the first communication line in a case where facsimile sending instruction information, which is different from the first user information, is received by the information input device when the first communication line is in a state of having been connected by the line connecting device, the first user information and the facsimile sending instruction information being received by the information input device as a result of a sequence of user operations for sending target facsimile data which is a sending target of a single facsimile transmission; and
    a facsimile sending device that re-connects the first communication line disconnected by the line disconnecting device, and sends the target facsimile data by utilizing the first communication line in accordance with the facsimile sending instruction information,
    wherein the information input device is configured to receive utilizing instruction information concerning the specific function, which is different from the first user information, as input information when the first communication line is in the state of having been connected by the line connecting device, and when receiving the utilizing instruction information, the line disconnecting device disconnects the first communication line, and the facsimile sending device does not re-connect the first communication line disconnected by the line disconnecting device.

2. The facsimile device as in claim 1, further comprising:
    a scanner that creates facsimile data by scanning a document,
    wherein the facsimile sending instruction information includes destination information identifying a destination of the target facsimile data, and scan start instruction information, and
    the line disconnecting device disconnects the first communication line in a case where the following condition is satisfied:
    the destination information and the scan start instruction information is received by the information input device when the first communication line is in a state of having been connected by the line connecting device; and
    the scanner completes the scanning of the document in accordance with the scan start instruction information.

3. The facsimile device as in claim 1, wherein in a case where the first user information is received by the information input device while facsimile data from outside is being received, the line connecting device maintains the state of the first communication line being connected after all of the facsimile data has been received.

4. The facsimile device as in claim 1, the facsimile device capable of communicating with an external device on a network by utilizing a second communication line, the facsimile device further comprising:
    a communication prohibiting device,
    wherein the facsimile sending device is configured to send the facsimile data in accordance with the facsimile sending instruction information from the external device, and
    the communication prohibiting device prohibits communication with the external device in the case where the first user information is received by the information input device.

5. The facsimile device as in claim 1, further comprising:
    a scanner that creates scan data by scanning a document;
    a printing device that prints the scan data created by the scanner; and
    a controller that makes the scanner create the scan data and makes the printing device print the scan data in a case where copy instruction information is received by the information input device,
    wherein the specific function is a copy function, and the utilizing instruction information concerning the specific function is the copy instruction information.

6. The facsimile device as in claim 1, further comprising:

a telephone call device, wherein the line connecting device connects the first communication line in a case where second user information being associated with function information including a telephone function is received by the information input device, the line disconnecting device disconnects the first communication line in a case where telephone call instruction information, which is different from the second user information, is received by the information input device when the first communication line is in a state of having been connected by the line connecting device, and the telephone call device re-connects the first communication line disconnected by the line disconnecting device and makes a telephone call by utilizing the first communication line in accordance with the telephone call instruction information.

* * * * *